United States Patent
Hsiao

(10) Patent No.: US 8,745,256 B2
(45) Date of Patent: Jun. 3, 2014

(54) METHOD AND SYSTEM FOR MULTIMEDIA AUDIO VIDEO TRANSFER

(75) Inventor: Yu-Hsia Hsiao, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 1034 days.

(21) Appl. No.: 12/684,115

(22) Filed: Jan. 8, 2010

(65) Prior Publication Data
US 2010/0198981 A1    Aug. 5, 2010

(30) Foreign Application Priority Data

Feb. 2, 2009   (TW) ............................... 98103290 A

(51) Int. Cl.
G06F 15/16   (2006.01)

(52) U.S. Cl.
USPC .......................................... 709/231; 709/219

(58) Field of Classification Search
CPC . G06F 17/30017; H04L 65/602; H04L 67/28; H04L 67/2842; H04L 65/4084; H04L 21/238; H04L 21/44055; H04L 7/1675
See application file for complete search history.

(56) References Cited

U.S. PATENT DOCUMENTS

| | | | |
|---|---|---|---|
| 7,505,889 B2* | 3/2009 | Salmonsen et al. | 703/23 |
| 8,243,924 B2* | 8/2012 | Chen et al. | 380/217 |
| 2004/0226047 A1* | 11/2004 | Lin et al. | 725/109 |
| 2008/0040453 A1* | 2/2008 | Cohen | 709/219 |
| 2008/0263589 A1* | 10/2008 | Jacobson et al. | 725/37 |
| 2009/0106356 A1* | 4/2009 | Brase et al. | 709/203 |
| 2009/0219392 A1* | 9/2009 | Roskowski | 348/143 |
| 2010/0066808 A1* | 3/2010 | Tucker et al. | 348/14.09 |
| 2010/0077290 A1* | 3/2010 | Pueyo | 715/230 |

FOREIGN PATENT DOCUMENTS

| | | |
|---|---|---|
| CN | 1953542 A | 4/2007 |
| TW | 200714034 A1 | 4/2007 |
| TW | 200733729 A1 | 9/2007 |

OTHER PUBLICATIONS

Corresponding TW Office Action & its partial English translation.

* cited by examiner

Primary Examiner — Peling Shaw
(74) Attorney, Agent, or Firm — CKC & Partners Co., Ltd.

(57) ABSTRACT

A method for multimedia audio video transfer includes the following steps: connecting to a webpage server; downloading an user interface and a multimedia object from the webpage server; connecting to a media server via a network protocol; driving a stream capturing means; capturing a stream; transmitting the stream to an audio video proxy via an audio video storage; transforming the stream into a live media stream; transmitting the live media stream to the media server; and transmitting the live media stream to a multimedia application player via the network protocol.

18 Claims, 10 Drawing Sheets

METHOD AND SYSTEM FOR MULTIMEDIA AUDIO VIDEO TRANSFER

RELATED APPLICATIONS

This application claims priority to Taiwan Application Serial Number 98103290, filed Feb. 2, 2009, which is herein incorporated by reference.

BACKGROUND

1. Field of Invention

The present invention relates to a method and system for multimedia audio video transfer. More particularly, the present invention relates to a method and system for multimedia audio video transfer using an open source server.

2. Description of Related Art

With the advancement in technology and the wide spread use of broadband and camera equipment, video clips become wild popular. This makes the Internet users switch their roles from the conventional information receivers to information distributors, and the users may further set up their own private cinema, video distribution sites, news stations and so on to replace the conventional media. Everyone may create their own multi-media blogs to share video clips, such as the well-known YouTube, Google Video, Yahoo! Video and so on. However, multimedia audio and video may generate various sized audio video files according to different video encoding technologies, making the users to take more time to download audio and video files. Thus, each vendor provides a variety of online streaming technology and network multimedia player, such as Windows Media Player, QuickTime, RealPlayer, Flash Player and so on, to play multimedia files online.

The video encoding technology provided by Adobe Flash, referred to as FLV, is a file format used to deliver video over the Internet using Adobe Flash Player. Because of the low-bandwidth requirement and the easy plug-in into personal blogs or other websites via Flash Plug-in, Adobe Flash quickly receives popularity and success. In addition, Adobe Flash has been widely used on the Internet, and almost all Internet users have already installed Adobe Flash Player. So, there is no need to install any additional plug-ins when using FLV. Furthermore, Flash streaming technology is stable and smooth, and will not take up too much bandwidth. Also, Flash streaming technology is cross-platform, so developers do not need to consider browser compatibility issues. Compared to other streaming technologies, Flash streaming technology is the best choice under current wide spread use of Internet applications. As the video websites flourish, this file format becomes dominant on the web.

Please refer to FIG. 1, a diagram illustrating currently available Flash video encoding technology. To use Flash video encoding technology, it is required to install Flash Media Server 110 developed by Adobe on the server side. Transform the audio video file (such as MPEG file 115) to generate the FLV file 118 using Flash Media Server 110. Then, encapsulate the FLV file 118 into the SWF object 130 and play it on the web through Adobe Flash Player 150 developed by Adobe.

However, the Flash Media Server developed by Adobe is not free to share, and it cannot directly capture the audio video information from video multimedia devices such as Network Based IP Camera. Therefore, there is a need to provide a method and system for multimedia audio video transfer to improve the aforementioned shortcomings.

SUMMARY

The objective of the present invention is to provide a method and system for multimedia audio video transfer, using media server as the application of video transmitting server. No actual files (stored in a hard drive) are generated throughout the process to use the system resources. The media stream won't use too much bandwidth, and the file download won't take too much time to complete. Thus, this invention provides instant play of audio video and real-time camera surveillance.

According to one embodiment of the present invention, a method for multimedia audio video transfer includes the following steps: connecting to a webpage server; downloading an user interface and a multimedia object from the webpage server; connecting to a media server via a network protocol; driving a stream capturing means; capturing a stream; transmitting the stream to an audio video proxy via an audio video storage; transforming the stream into a live media stream; transmitting the live media stream to the media server; and transmitting the live media stream to a multimedia application player via the network protocol.

According to another embodiment of the present invention, a system for multimedia audio video transfer includes a stream capturing means, an audio video proxy, a media server, and an audio video storage. The stream capturing means is for capturing a stream from a video multimedia device. The audio video proxy is for transforming the stream into a live media stream. The media server includes a media proxy application module for driving the stream capturing means. The audio video storage is for storing the media stream captured by the stream capturing means.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
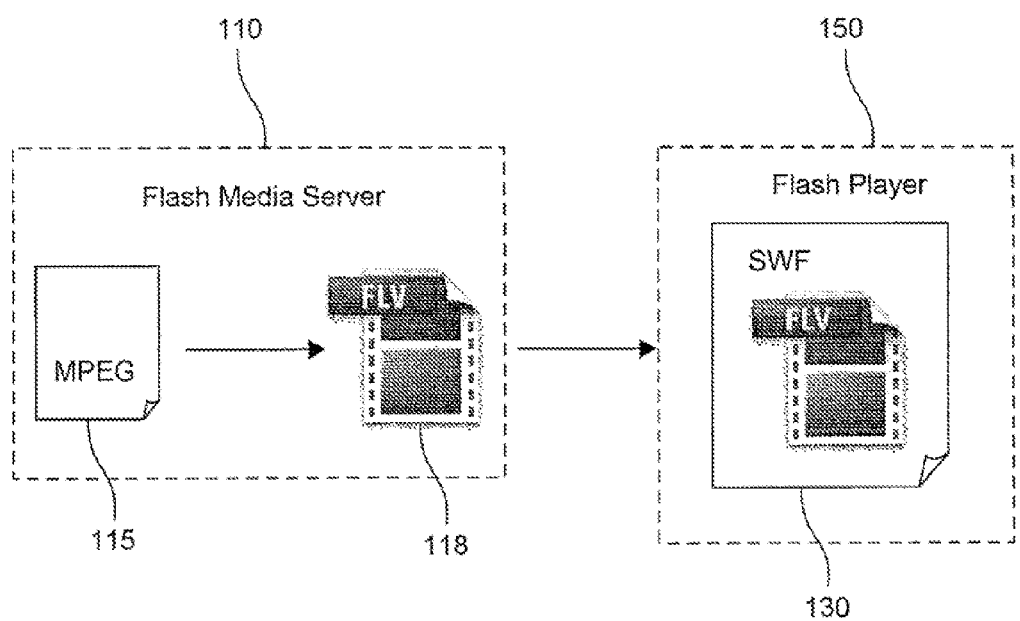
FIG. 1 is a diagram illustrating currently available Flash video encoding technology.

Reference will now be made in detail to the embodiment of this invention, examples of which are illustrated in the accompanying drawings. Wherever possible, the same reference numbers are used in the drawings and the description to refer to the same or like parts.

Figure 2:
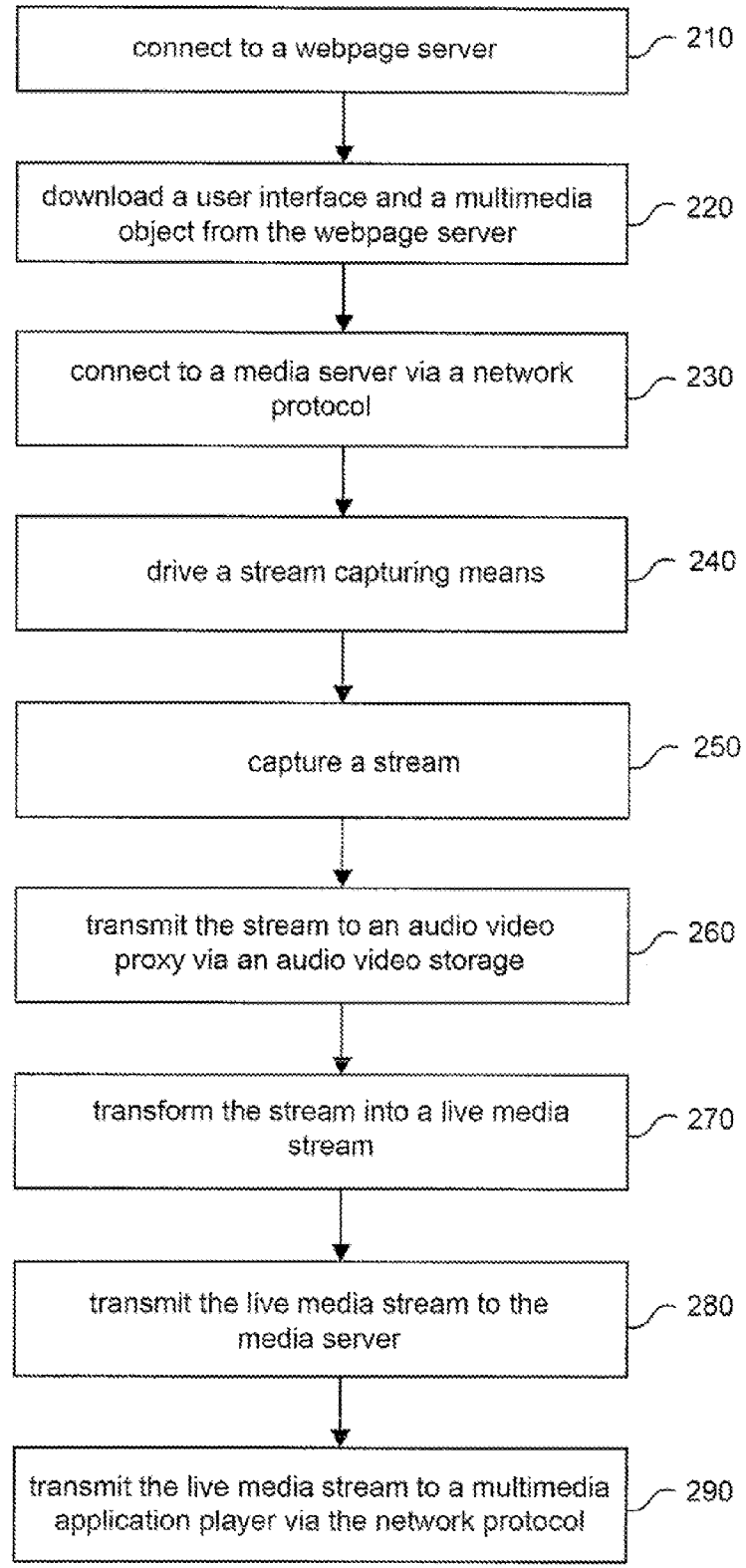
FIG. 2 is a flow chart illustrating a method for multimedia audio video transfer according to one embodiment of this invention.

FIG. 2 is a flow chart illustrating a method for multimedia audio video transfer according to one embodiment of this invention. This method includes the following steps. (It should be understood that the order of steps involved in this embodiment may be adjusted according to the actual practices. The steps or part of the steps may be performed at the same time.)

(1) Connect to a webpage server (step 210). The user may connect to a pre-configured webpage server via a common network protocol such as TCP/IP.

(2) Download a user interface and a multimedia object from the webpage server (step 220). The user may be able to download the user interface and the multimedia object such as a SWF object to the user's browser.

(3) Connect to a media server via a network protocol (step 230). The SWF object downloaded from the previous step would drive the Flash Player to connect to the media server via a network protocol such as RTMP. The media server is an open source server such as a Red5 server.

(4) Drive a stream capturing means (step 240). A media proxy application module may be installed on the media server. After the user is connected with the media proxy application module, the media proxy application module may drive a stream capturing means so as to start capturing a stream.

(5) Capture a stream (step 250). Various kinds of processes may be performed according to the types of video multimedia devices so as to capture the stream.

(6) Transmit the stream to an audio video proxy via an audio video storage (step 260).

(7) Transform the stream into a live media stream (step 270). The audio video proxy may transform various streams into live media streams, which are live streams in Flash video format.

(8) Transmit the live media stream to the media server (step 280).

(9) Transmit the live media stream to a multimedia application player via the network protocol (step 290). For example, the red5 server transmits Flash Video live stream to a Flash player at the user computer via RTMP protocol.

Figure 3:
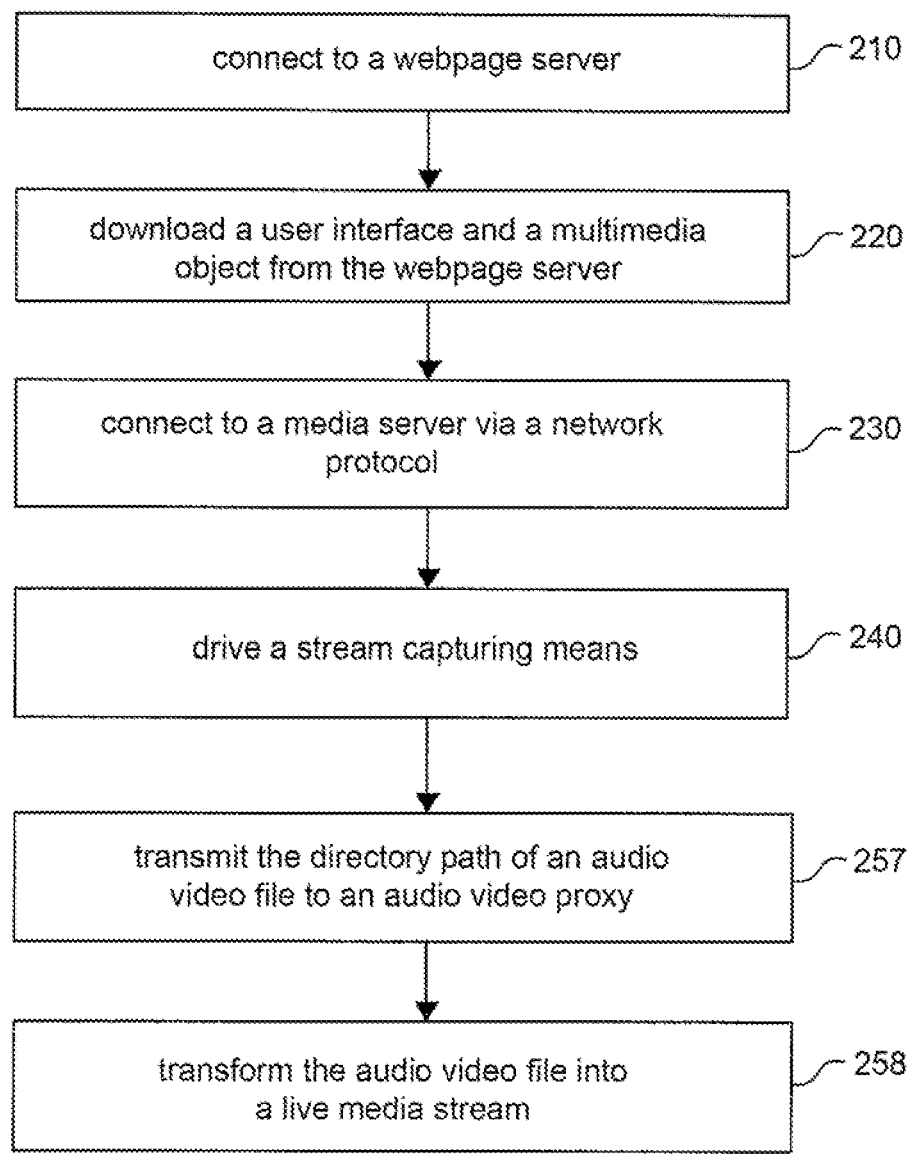
FIG. 3 is a flow chart illustrating a method for multimedia audio video transfer according to another embodiment of this invention.

FIG. 3 is a flow chart illustrating a method for multimedia audio video transfer according to another embodiment of this invention. This embodiment is different from the previous one in that the stream may come from the audio video files stored in the audio video storage. After the stream capturing means is driven (step 240), the directory path of an audio video file is transmitted to an audio video proxy (step 257). Then, the audio video proxy transforms the audio video file into a live media stream (step 258).

Figure 4A:
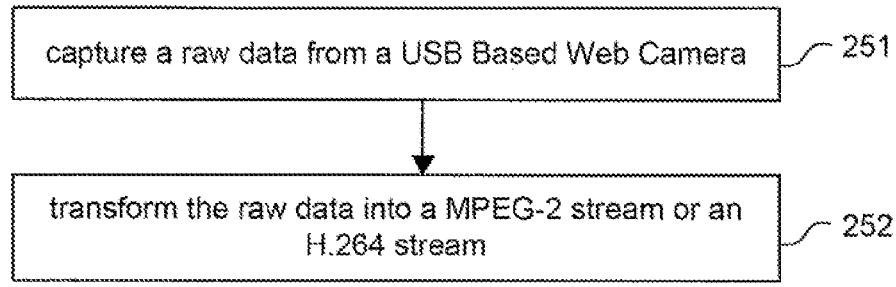
FIG. 4A is a flow chart illustrating the sub-steps included in step 250 capturing a stream shown in FIG. 2.

FIG. 4A is a flow chart illustrating the sub-steps included in step 250 capturing a stream shown in FIG. 2. First, a raw data from a USB Based Web Camera is captured (step 251). Then, the raw data is transformed into a MPEG-2 stream or an H.264 stream (step 252).

Figure 4B:
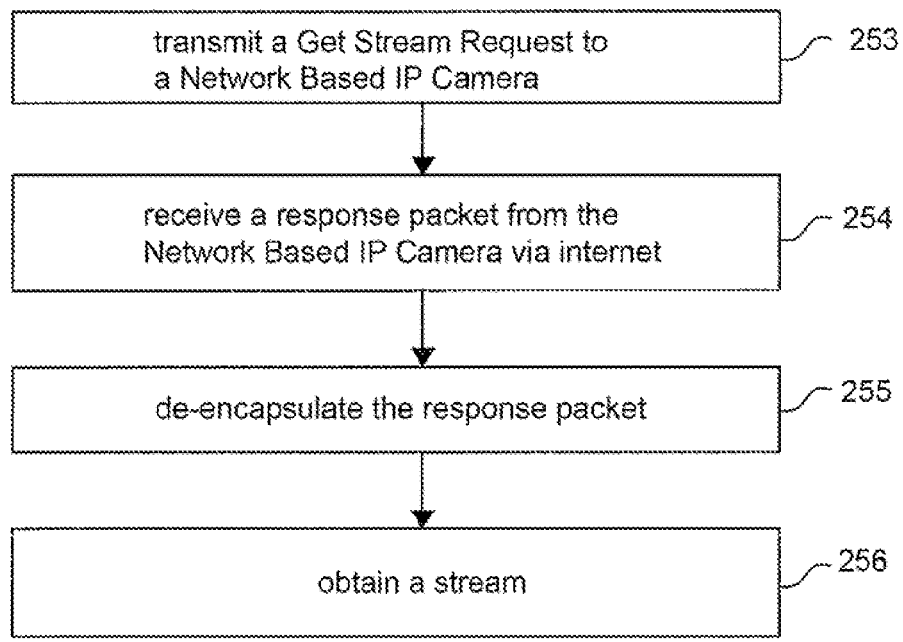
FIG. 4B is a flow chart illustrating the sub-steps included in step 250 capturing a stream shown in FIG. 2.

FIG. 4B is a flow chart illustrating the sub-steps included in step 250 capturing a stream shown in FIG. 2. First, a Get Stream Request is transmitted to a Network Based IP Camera (step 253). Next, a response packet from the Network Based IP Camera is received via Internet (step 254). Then, the response packet is de-encapsulated (step 255), and the stream is obtained (step 256).

Figure 5:
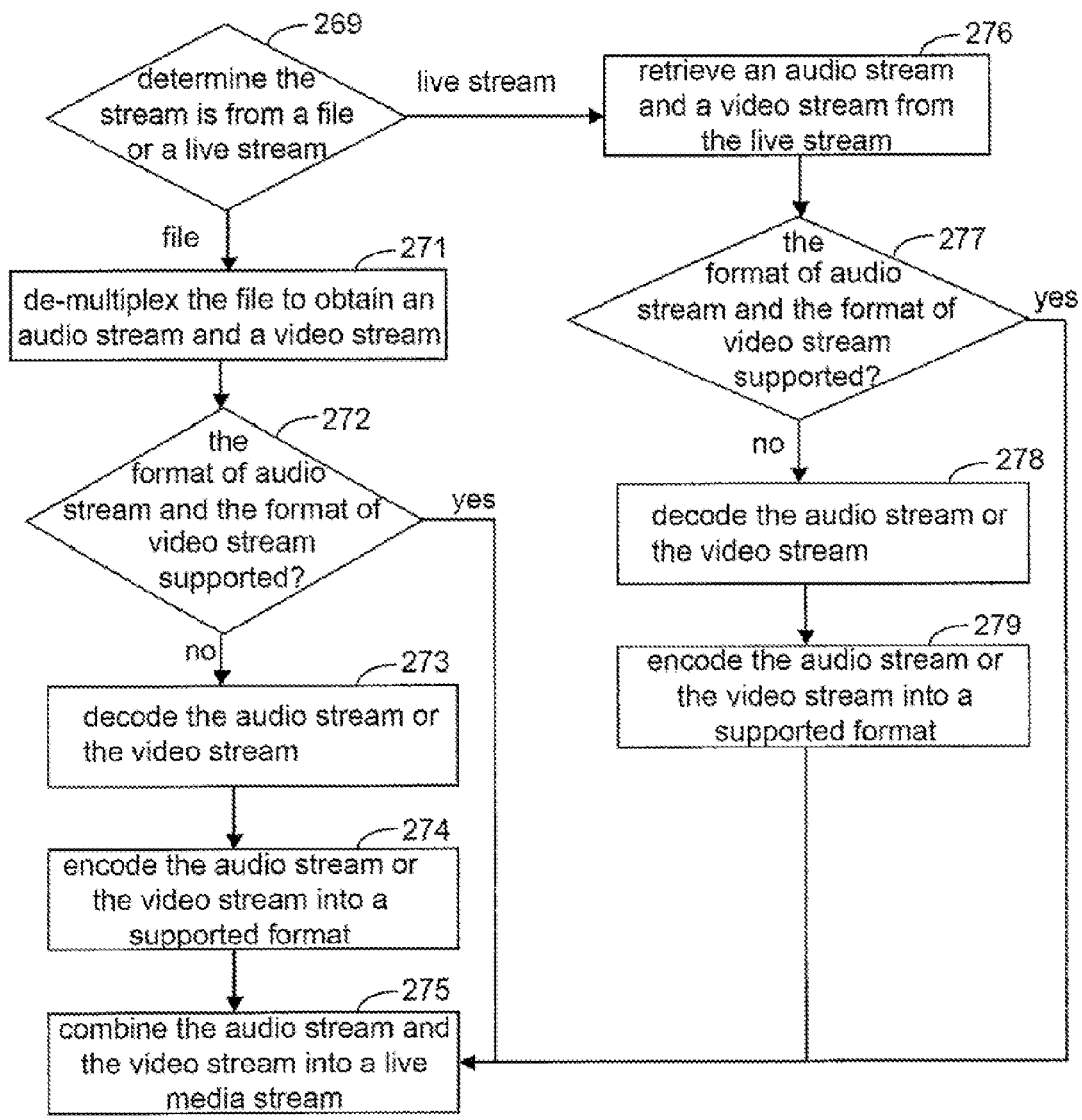
FIG. 5 is a flow chart illustrating the sub-steps included in step 270 transforming the stream into the live media stream shown in FIG. 2.

FIG. 5 is a flow chart illustrating the sub-steps included in step 270 transforming the stream into the live media stream shown in FIG. 2:

(1) Determine the stream is from a file or a live stream (step 269).

(2) When the stream is from the file, the step of transforming into a live media stream includes the following steps:
  (2.1) De-multiplex the file to obtain an audio stream and a video stream (step 271).
  (2.2) Determine whether the format of the audio stream and the format of the video stream are supported (step 272).
  (2.3) When the format of the audio stream or the format of the video stream is not supported, decode the audio stream or the video stream (step 273).
  (2.4) Encode the audio stream or the video stream into a supported format (step 274).
  (2.5) Combine the audio stream and the video stream into a live media stream (step 275). On the other hand, when the format of the audio stream and the format of the video stream are supported, the audio stream and the video stream may be combined into a live media stream directly.

(3) When the stream is from a live stream, the step of transforming into a live media stream includes the following steps:
  (3.1) Retrieve an audio stream and a video stream from the live stream (step 276).
  (3.2) Determine whether the format of the audio stream and the format of the video stream are supported (step 277).
  (3.3) When the format of the audio stream or the format of the video stream is not supported, decode the audio stream or the video stream (step 278).
  (3.4) Encode the audio stream or the video stream into a supported format (step 279).
  (3.5) Combine the audio stream and the video stream into a live media stream (step 275). On the other hand, when the format of the audio stream and the format of the video stream are supported, the audio stream and the video stream may be combined into a live media stream directly.

At step 280, there are two scenarios when the live media stream is transmitted to the media server. One scenario is that when the media server and the audio video proxy are installed on the same computer, the live media stream may be transmitted via input output stream. Another scenario is that when the media server and the audio video proxy are installed on separate computers, the live media stream is transmitted via network protocols (such as RTP).

Figure 6:
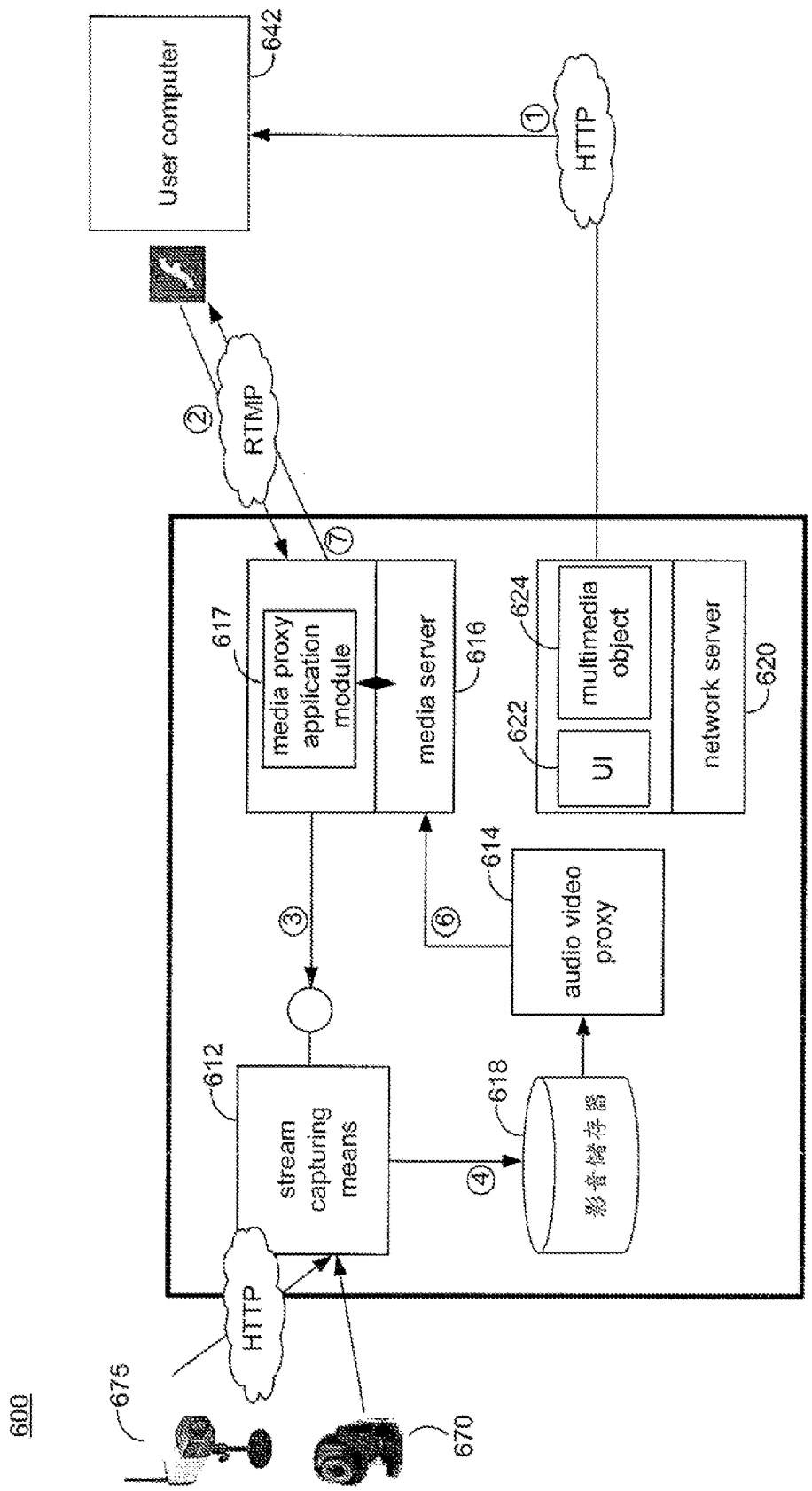
FIG. 6 is a block diagram illustrating a system for multimedia audio video transfer according to yet another embodiment of this invention.

FIG. 6 is a block diagram illustrating a system for multimedia audio video transfer according to yet another embodiment of this invention. A system for multimedia audio video transfer 600 includes a stream capturing means 612, an audio video proxy 614, a media server 616, and an audio video storage 618. The stream capturing means 612 may capture a stream from a video multimedia device. The video multimedia device may be a USB Based Web Camera 670 or a Network Based IP Camera 675. However, the stream capturing means 612 not only supports the video multimedia device such as the USB Based Web Camera 670 or the Network Based IP Camera 675, but also may extend to other kinds of video multimedia devices in the future. The audio video proxy 614 may transform the stream into a live media stream, such as Flash Video live stream. The media server 616 may use an open source server (such as the Red5 sever) as the server for transmitting video files. Moreover, the media server 616 may include a media proxy application module 617 so as to drive the stream capturing means 612. The media proxy application module 617 may be a Flash application module.

In one embodiment, a user computer 642 may connect to a network server 620 (such as HTTP server) via TCP/IP (such as HTTP) and download the User Interface 622 and multimedia object 624 (such as SWF object) to a browser. The SWF object may drive Flash Player and connect to the media server 616 (such as Red5 server) via RTMP protocol. After that, the media proxy application module 617 installed on the media server 616 will drive the stream capturing means 612 to capture the stream according to different video multimedia devices, and transmit the captured live stream to the audio video proxy 614 via the audio video storage 618. Then, the audio video proxy 614 transforms the stream into FLV live stream according to different stream format and transmits to the media proxy application module 617 installed on the media server 616. Last, the live stream is transmitted to the Flash player at the user computer 642 for playing via RTMP protocol.

Figure 7:
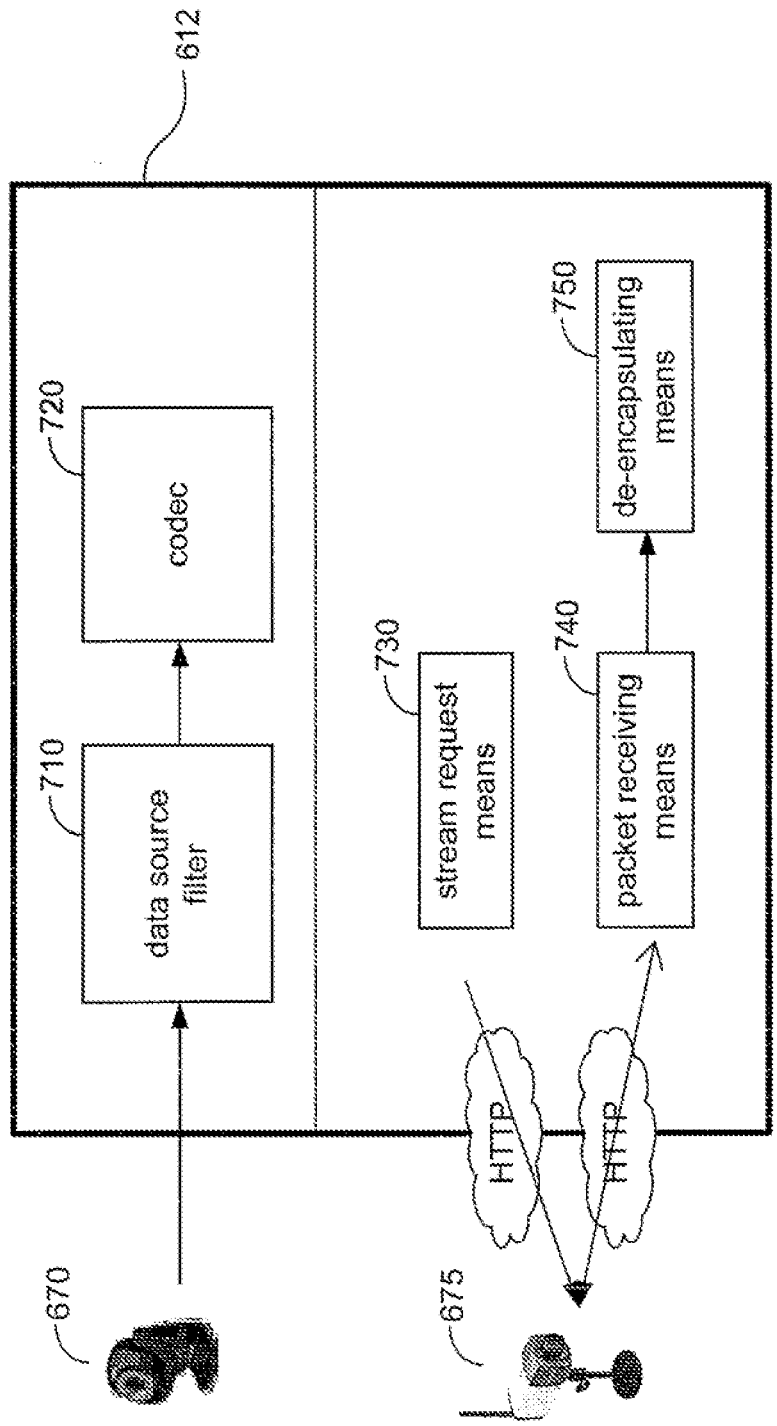
FIG. 7 is a block diagram illustrating the stream capturing means 612 as shown in FIG. 6.

FIG. 7 is a block diagram illustrating the stream capturing means 612 as shown in FIG. 6. The stream capturing means 612 includes a data source filter 710, a codec 720, a stream request means 730, a packet receiving means 740, and a de-encapsulating means 750. When the system 600 has the USB Based Web Camera 670, the data source filter 710 may capture raw data from the USB Based Web Camera 670. The codec 720 may transform the raw data into a MPEG-2 stream or an H.264 stream. On the other hand, when the system 600 has the Network Based IP Camera 675, the stream request means 730 may transmit a Get Stream Request to the Network Based IP Camera 675. Then, the packet receiving means 740 may receive a response packet from the Network Based IP Camera 675 via Internet, and the de-encapsulating means 750 may de-encapsulate the response packet.

Figure 8:
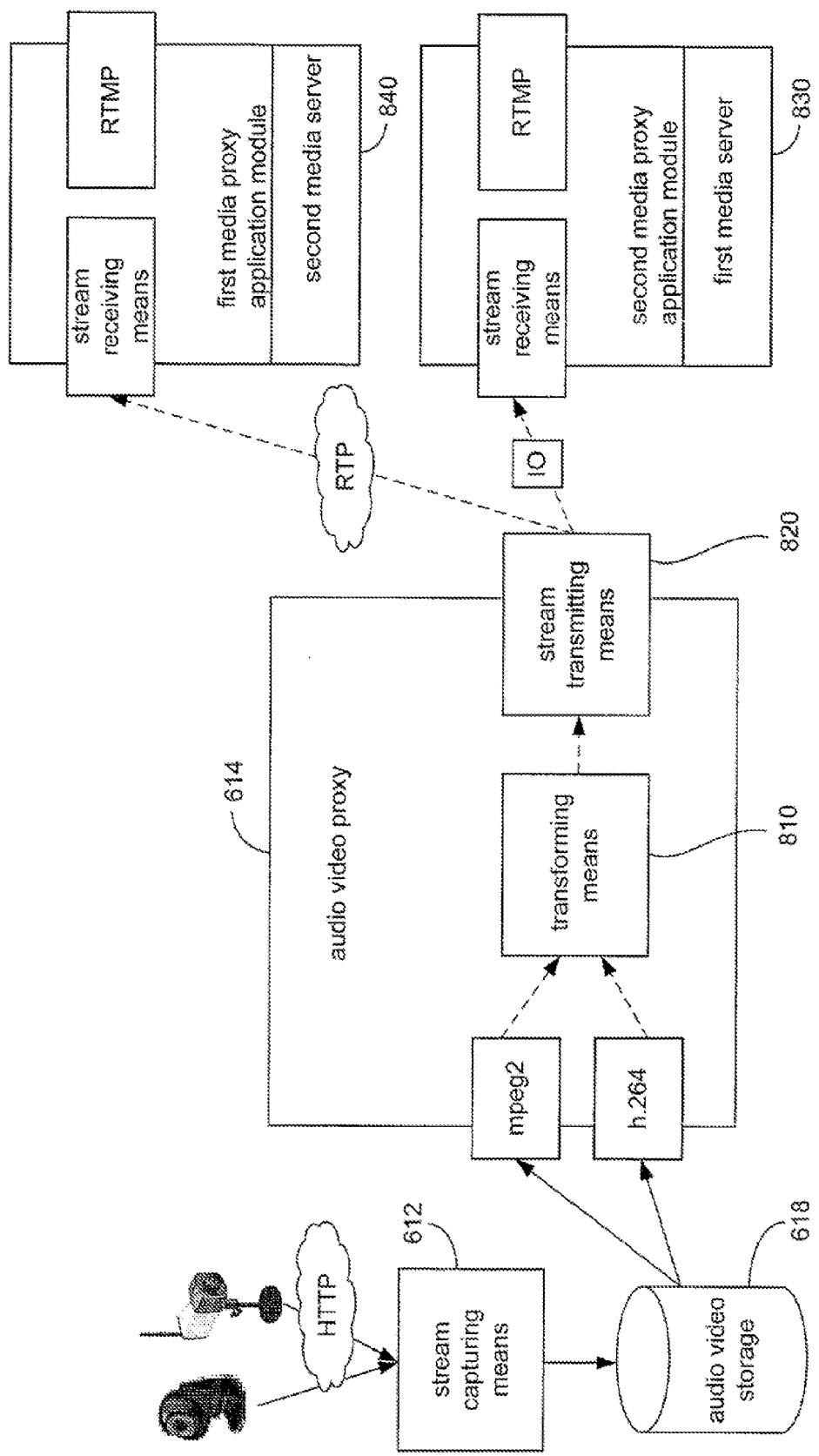
FIG. 8 is a block diagram illustrating the audio video proxy 614 as shown in FIG. 6.

FIG. 8 is a block diagram illustrating the audio video proxy 614 as shown, in FIG. 6. The audio video proxy 614 includes a transforming means 810 and a stream transmitting means 820. The transforming means 810 may transform a MPEG-2 stream or an H.264 stream into a live media stream, and the stream transmitting means 820 may transmit the live media stream to the first media server 830 or the second media server 840. The first media server 830 and the audio video proxy 614 are installed on the same computer, and the live media stream may be transmitted via input output stream. The second media server 840 and the audio video proxy 614 are installed on separate computers, and the live media stream may be transmitted via network protocols (such as RTP).

Figure 9:
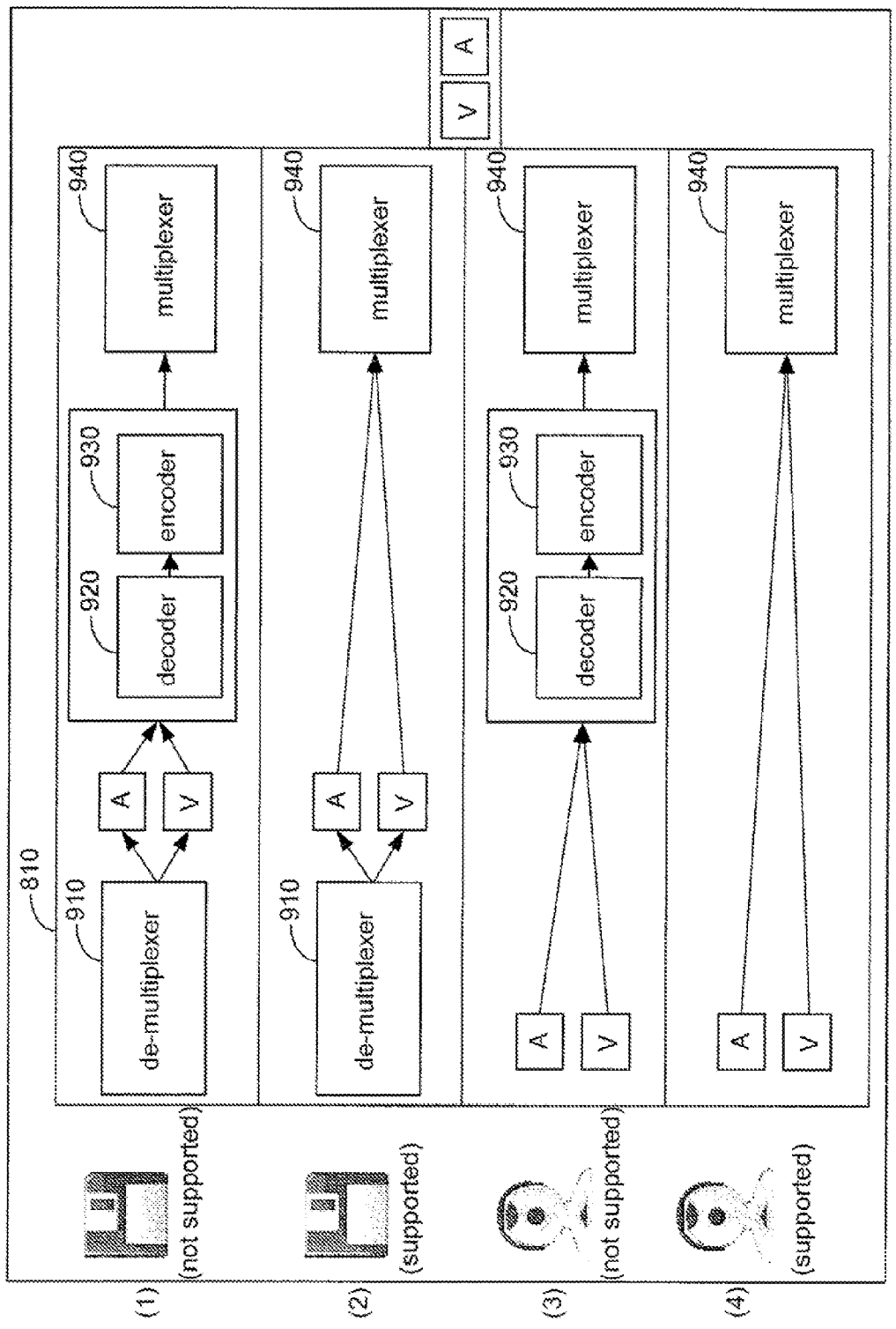
FIG. 9 is a block diagram illustrating the transforming means 810 as shown in FIG. 8.

FIG. 9 is a block diagram illustrating the transforming means 810 as shown in FIG. 8. The transforming means 810 includes a de-multiplexer 910, a decoder 920, an encoder 930, and a multiplexer 940. Detailed aspects of the embodiment will be provided below to illustrate the operation among the components. When the audio video proxy 614 receives the stream, the transforming means 810 in the audio video proxy 614 may perform various transformations according to different stream origins and the stream formats supported by FLV (as shown in Table 1). There are four possible transformation scenarios. First, when the stream is from a file, and the stream format of the file is not supported by the FLV. Second, when the stream is from a file, and the stream format of the file is supported by the FLV. Third, when the stream is a live stream, and the stream format is not supported by the FLV. Forth, when the stream is a live stream, and the stream format is supported by the FLV. The detailed transformation descriptions for each scenario are as following:

1. When the stream is from a file, and the stream format of the file is not supported by the FLV. When the stream is from a file, the de-multiplexer 910 de-multiplexes the file and obtains an audio stream and a video stream from the file. Then, determine whether the format of the audio stream or the format of the video stream is supported by FLV. When the format of the audio stream or the format of the video stream is determined not to be supported by FLV, the decoder 920 decodes the audio stream or the video stream. Then, the encoder 930 encodes the audio stream or the video stream into a format supported by FLV. Last, the multiplexer 940 combines the audio stream and the video stream into an FLV live stream and transmits to the stream transmitting means 820.

2. When the stream is from a file, and the stream format of the file is supported by the FLV. When the stream is from a file, the de-multiplexer 910 de-multiplexes the file and obtains an audio stream and a video stream from the file. Then, determine whether the format of the audio stream or the format of the video stream is supported by FLV. When the format of the audio stream or the format of the video stream is determined to be supported by FLV, the multiplexer 940 directly combines the audio stream and the video stream into an FLV live stream and transmits to the stream transmitting means 820.

3. When the stream is a live stream, and the stream format is not supported by the FLV. When the stream is a live stream, the transmitting means 810 determines whether the format of the audio to stream or the format of the video stream is supported by FLV. When the format of the audio stream or the format of the video stream is determined not to be supported by FLV, the decoder 920 decodes the audio stream or the video stream. Then, the encoder 930 encodes the audio stream or the video stream into a format supported by FLV. Last, the multiplexer 940 combines the audio stream and the video stream into an FLV live stream and transmits to the stream transmitting means 820.

4. When the stream is a live stream, and the stream format is supported by the FLV. When the stream is a live stream, the transmitting means 810 determines whether the format of the audio stream or the format of the video stream is supported by FLV. When the format of the audio stream or the format of the video stream is determined to be supported by FLV, the multiplexer 940 directly combines the audio stream and the video stream into an FLV live stream and transmits to the stream transmitting means 820.

TABLE 1

| Type | Audio | Video |
|---|---|---|
| Supported Format | Linear PCM, platform endian<br>ADPCM<br>MP3<br>Linear PCM, little endian<br>Nellymoser 16-kHz mono<br>Nellymoser 8-kHz mono<br>Nellymoser<br>G.711 A-law logarithmic PCM<br>G.711 mu-law logarithmic PCM<br>reserved<br>AAC<br>MP3 8-Khz<br>Device-specific sound | JPEG (currently unused)<br>Sorenson H.263<br>Screen video<br>On2 VP6<br>On2 VP6 with alpha channel<br>Screen video version 2<br>AVC |

Figure 10:
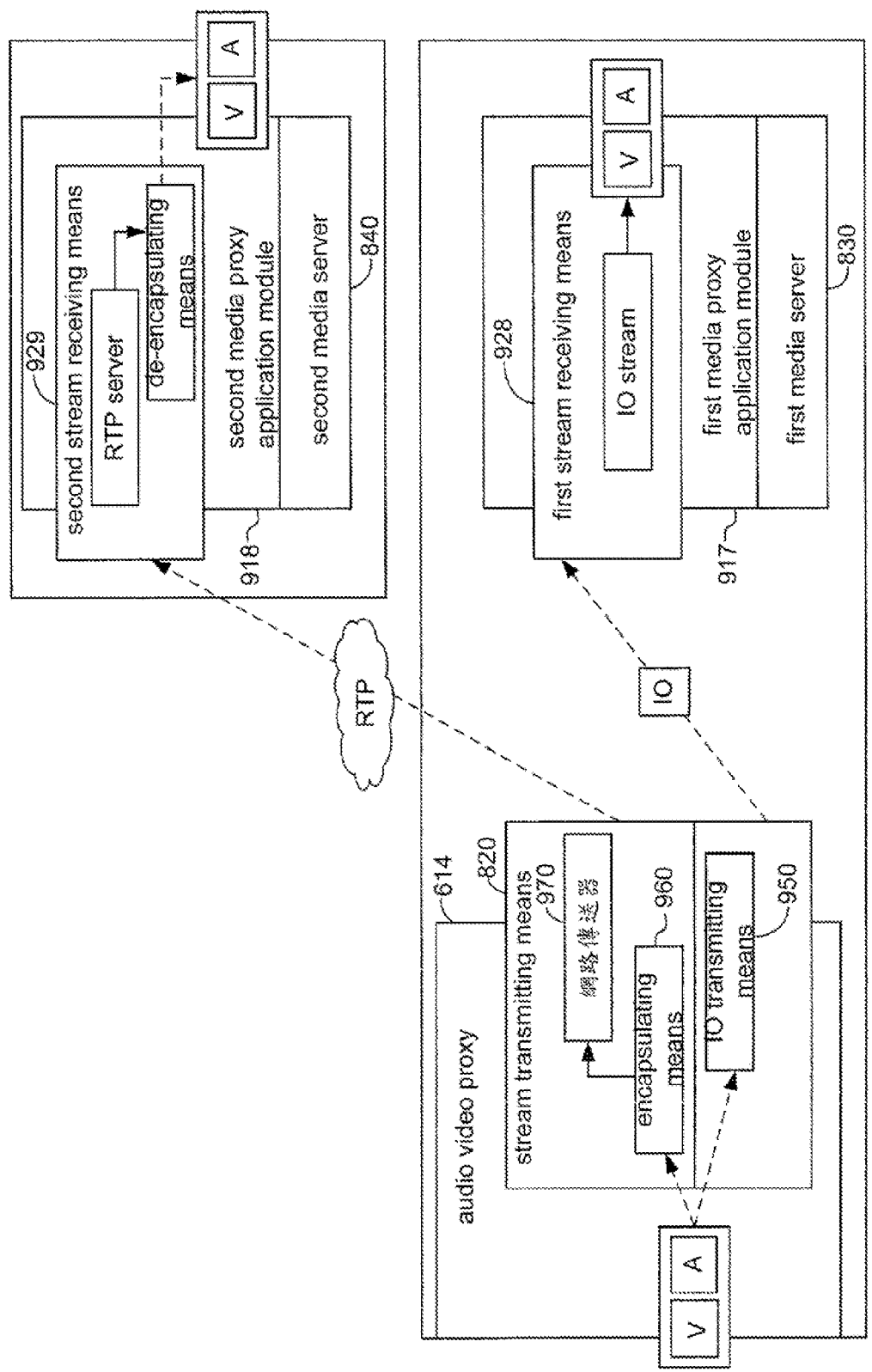
FIG. 10 is a block diagram illustrating the stream transmitting means 820 as shown in FIG. 8.

When the stream transmitting means receives a live stream, different ways are used to transmit the live stream according to where the media proxy application module is stalled (i.e. where the media server is installed). FIG. 10 is a block diagram illustrating the stream transmitting means 820 as shown in FIG. 8. The stream transmitting means 820 includes an input output transmitting means 950, an encapsulating means 960, and a network transmitting means 970. When the media server and the audio video proxy 614 are installed on the same computer, the input output transmitting means 950 may transmit the live media stream via input output stream to the first media server 830. After the first stream receiving means 928 on the first media proxy application module 917 receives the live media stream, the live media stream will be transmitted to the user computer 642. The user may play the multimedia content live via a user operating interface.

When the media server and the audio video proxy 614 are installed on separate computers, the encapsulating means 960 included in the stream transmitting means 820 encapsulates and transmits the live media stream to another computer via the network transmitting means 970. Then, the second stream receiving means 929 on the second media proxy application module 918 de-encapsulates the received packets and obtains the live media stream. For example, the second stream receiving means 929 may include an RTP server and a de-encapsulating means for the processing of RTP packets so as to obtain the live media stream. The live media stream will be transmitted to the user computer 642, and the user may play the multimedia content live via a user operating interface.

In conclusion, the method and system for multimedia audio video transfer as disclosed in the aforementioned embodiments use the media server as the application of video transmitting server. In the aforementioned embodiments, the audio video proxy may not only transform the audio video files stored in the audio video storage into streams with supported format, but also capture streams from various video multimedia devices (such as a USB Based Web Camera or Network Based IP Camera) via the stream capturing means. Then, the format of the stream may be transformed into a supported format and transmitted to the user computer for playing via the media server (such as a Red5 server).

Furthermore, no actual files (stored in a hard drive) are generated throughout the process to use the system resources. The media stream won't use too much bandwidth, and the file download won't take too much time to complete. Thus, this invention provides instant play of audio video and real-time camera surveillance.

It will be apparent to those skilled in the art that various modifications and variations can be made to the structure of the embodiment without departing from the scope or spirit of the invention. In view of the foregoing, it is intended that the embodiment cover modifications and variations of this invention provided they fall within the scope of the following claims and their equivalents.

What is claimed is:

1. A method for multimedia audio video transfer comprising the following steps:
    (a) connecting to a webpage server;
    (b) downloading a user interface and a multimedia object from the webpage server;
    (c) connecting to a media server via a network protocol;
    (d) driving a stream capturing means;
    (e) capturing a stream;
    (f) transmitting the stream to an audio video proxy via an audio video storage;
    (g) transforming the stream into a live media stream;
    (h) transmitting the live media stream to the media server; and
    (i) transmitting the live media stream to a multimedia application player via the network protocol,
    wherein step (g) transforming the stream into a live media stream comprises the following steps:
    determining the stream is from a file or a live stream;
    when the stream is from the file, the transforming comprising the following steps:
        de-multiplexing the file to obtain an audio stream and a video stream;
        determining whether the format of the audio stream and the format of the video stream are supported;
        decoding the audio stream or the video stream when the format of the audio stream or the format of the video stream is not supported,
        encoding the audio stream or the video stream into a supported format;
        combining the audio stream and the video stream into a live media stream; and
        combining the audio stream and the video stream into a live media stream when the format of the audio stream and the format of the video stream are supported;
    when the stream is from a live stream, the transforming comprising the following steps:
        retrieving an audio stream and a video stream from the live stream;
        determining whether the format of the audio stream and the format of the video stream are supported;
        decoding the audio stream or the video stream when the format of the audio stream or the format of the video stream is not supported;
        encoding the audio stream or the video stream into a supported format;
        combining the audio stream and the video stream into a live media stream; and
    combining the audio stream and the video stream into a live media stream when the format of the audio stream and the format of the video stream are supported.

2. The method of claim 1, wherein the live media stream is a Flash Video live stream.

3. The method of claim 1, wherein the media server is an open source server, and wherein the open source server is a Red5 server.

4. The method of claim 1, further comprising a step after step (d) driving a stream capturing means:
    transmitting a directory path of an audio video file to an audio video proxy; and
    transforming the audio video file into a live media stream.

5. The method of claim 1, wherein step (e) capturing a stream comprises the following steps:
    capturing a raw data from a USB Based Web Camera; and
    transforming the raw data into a MPEG-2 stream or an H.264 stream.

6. The method of claim 1, wherein step (e) capturing a stream comprises the following steps:
    transmitting a Get Stream Request to a Network Based IP Camera;
    receiving a response packet from the Network. Based IP Camera via Internet;
    de-encapsulating the response packet; and
    obtaining a stream.

7. The method of claim 1, wherein step (h) transmitting the live media stream to the media server comprises the following step:
    transmitting the live media stream via input output stream when the media server and the audio video proxy are installed on the same computer.

8. The method of claim 1, wherein step (h) transmitting the live media stream to the media server comprises the following step:
    transmitting the live media stream via network protocols when the media server and the audio video proxy are installed on separate computers.

9. A system for multimedia audio video transfer comprising:
    a stream capturing device for capturing a stream from a video multimedia device;
    an audio video proxy for transforming the stream into a live media stream, wherein the audio video proxy further comprises:

a transforming device for determining the stream is from a file or a live stream and transforming the stream into a live media stream according to the determining result; and a stream transmitting device for transmitting the live media stream to the media server, includes a transforming device;

a media server comprising:

a media proxy application module for driving the stream capturing device; and an audio video storage for storing the media stream captured by the stream capturing device.

10. The system of claim 9, wherein the live media stream is a Flash Video live stream.

11. The system of claim 9, wherein the video multimedia device is a USB Based Web Camera.

12. The system of claim 11, wherein the stream capturing device comprises:

a data source filter for capturing a raw data from a USB Based Web Camera; and a codec for transforming the raw data into a MPEG-2 stream or an H.264 stream.

13. The system of claim 9, wherein the video multimedia device is a Network Based IP Camera.

14. The system of claim 13, wherein the stream capturing device comprises:

a stream request device for transmitting a Get Stream Request to a Network Based IP Camera;

a packet receiving device for receiving a response packet from the Network Based P Camera via Internet; and a de-encapsulating device for de-encapsulating the response packet.

15. The system of claim 9, wherein the transforming device comprises:

a de-multiplexer for obtaining an audio stream and a video stream from a file when the stream is from the file;

a decoder for decoding the audio stream or the video stream when the format of the audio stream or the format of the video stream is not supported;

an encoder for encoding the audio stream or the video stream into a supported format; and a multiplexer for combining the audio stream and the video stream into a live media stream.

16. The system of claim 9, wherein the stream transmitting device comprises:

an input output transmitting device for transmitting the live media stream via input output stream when the media server and the audio video proxy are installed on the same computer;

an encapsulating device for encapsulating the live media stream when the media server and the audio video proxy are installed on separate computers; and a network transmitting device for transmitting the live media stream via network protocols when the media server and the audio video proxy are installed on separate computers.

17. The system of claim 9, wherein the media proxy application module comprises:

a stream receiving device for receiving and processing the live media stream form the stream transmitting device.

18. The system of claim 9, wherein the media server is an open source server, and wherein the open source server is a Red5 server.

* * * * *